April 27, 1926.
B. D. THOMAS
AIRPLANE CONSTRUCTION
Filed March 8, 1923
1,582,706
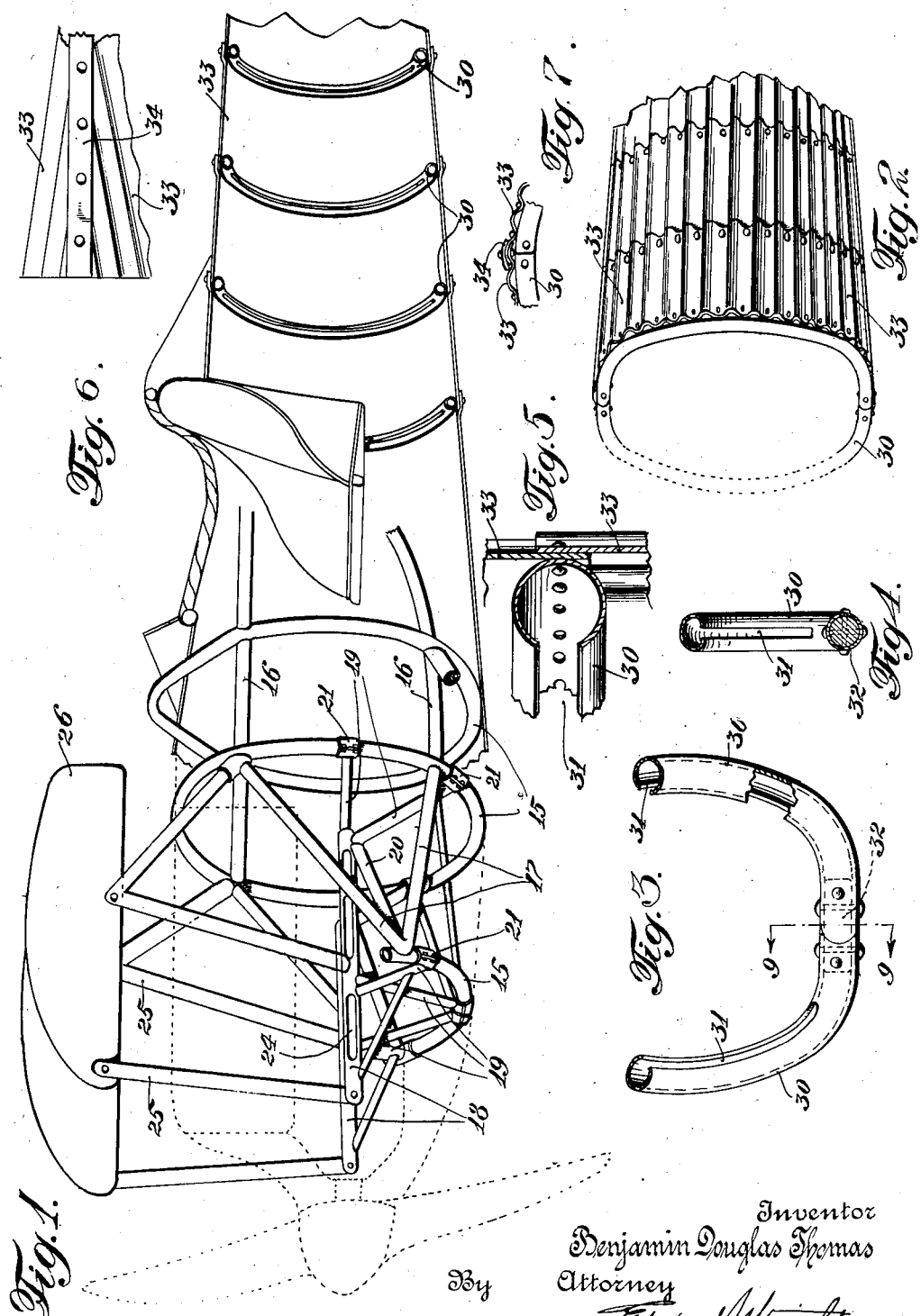

Patented Apr. 27, 1926.

1,582,706

UNITED STATES PATENT OFFICE.

BENJAMIN DOUGLAS THOMAS, OF ITHACA, NEW YORK, ASSIGNOR OF ONE-TENTH TO THOMAS-MORSE AIRCRAFT CORPORATION, OF ITHACA, NEW YORK, A CORPORATION OF NEW YORK.

AIRPLANE CONSTRUCTION.

Application filed March 8, 1923. Serial No. 623,612.

*To all whom it may concern:*

Be it known that I, BENJAMIN DOUGLAS THOMAS, a subject of the King of Great Britain, and a resident of Ithaca, in the county of Tompkins and State of New York, have invented a certain new and useful Improvement in Airplane Construction, of which improvement the following is a specification.

This invention relates to the construction of airplanes, and has for its objects to provide an improved fuselage structure, which consists of, at least in the rear portion aft of the cockpit, a series of transverse metal ribs or bulkhead members, preferably substantially circular or oval in shape, and of tubular or U-shaped section, and metal sheets, preferably corrugated and forming the skin or covering of the fuselage, which sheets are cut into suitable panel lengths having their ends overlapping at the ribs, and are riveted thereto. By this construction of the fuselage, the use of longérons in the rear portion is eliminated, the skin performing the function of longérons in tying together the ribs.

These features of my invention will now more fully appear from the following detailed description of a preferred embodiment thereof. In the accompanying drawings: Figure 1 is a perspective view of a part of a fuselage including the engine section; Fig. 2, a perspective view of a portion of the side of the fuselage showing the metal covering riveted to the ribs; Fig. 3, a detail view, showing the joint at the bottom between two halves of the rib; Fig. 4, a transverse section of the rib joint taken on the line 9—9 of Fig. 3; Fig. 5, a detail view showing the overlapping skin sheets riveted to the tubular metal rib; Fig. 6, a detail view, in plan, showing a cap strip covering the longitudinal edges of the metal sheets; and, Fig. 7, a transverse section of the same.

According to the construction illustrated in the drawings, I have shown my improvement applied in connection with a fuselage formed with tubular metal ribs, and at the engine portion of the fuselage, these ribs, 15, may be braced together by suitable longitudinal and diagonal members, 16 and 17, welded to the ribs and forming a truss effect. The rib members are preferably formed in two halves adapted to be joined together at the top and bottom points, whereby the frame sections may be assembled in halves, and then joined together. I may provide improved engine bearers, one frame at each side of the centre of the fuselage, and each comprising a horizontal longitudinal bed member, 18, having arms, or struts, 19, and diagonal braces, 20, welded thereto. The members of the engine bearer are preferably formed of tubular metal with the arms, 19, extending substantially at right angles to the longitudinal member, 18, and provided with split clamping members, 21, at their ends, for embracing the ribs, 15, and being securely fastened thereto. The clamping members may be formed in two semi-circular halves, adapted to fit over the tubular ribs, 15, and be secured together by bolts. Means may also be provided for supporting the engine bearer and the weight of the engine directly from the wing structure, as by the strut members, 25, connected to the longitudinal bed members, 18, of the engine bearer at their lower ends, and at their upper ends to a portion of the wing structure, such as the tank, 26, where the wing structure includes a tank, such as is often customary. The tank may serve as a gasolene supply or as a radiator for the engine.

According to my present improvement, the skin or covering of the fuselage is composed of metal sheets, or plates, 33, preferably corrugated, which are cut to suitable lengths to fit the panels, or distance between the ribs, and the overlapping ends of the sheets are riveted together and to the ribs, 30. Where covering of metal sheets, such as duralumin, has been used heretofore, difficulty has been experienced by the rivets shaking loose at the joints between plates or sheets where there was no supporting member. This difficulty is overcome in my improved construction, in which the overlapping joints come at the ribs and the rivets extend through both the rib and the overlapping ends of the plates.

As shown in Figs. 3, 4 and 5, the ribs, 30, are formed of tubular metal, and are made in two halves joined together at top and bottom. They are also formed with a slot, 31, upon the inner side and spread open so as to provide access to the inside of the tube to facilitate the operation of riveting the overlapping plates, 33, to the ribs, 30, as shown in detail in Fig. 5. For joining the two halves of the ribs, 30, at top and bottom, a filling block or strip, 32, is inserted in the abutting open ends of the two half portions of the tube and riveted to both ends, as indicated in Figs. 3 and 4. At the longitudinal joint between the edges of the corrugated sheets at the top and bottom of the tapering section of the fuselage, the edges are preferably pressed out so as to lap over each other and they are then joined by a metal cap strip, 34, with rivets extending through both the cap strip and the overlapping edges of the sheets, 33, as indicated in Figs. 6 and 7. The cap strip, 34, is of substantial thickness, and serves as a structural longitudinal member, as well as making a neat finish to the longitudinal joint between the plates where the corrugations converge at each side of the centre, owing to the tapering section of the fuselage.

Having now described my invention, what I claim as new and desire to secure by Letters Patent is:

1. An airplane fuselage, the rear portion of which consists solely of a plurality of semi-circular tubular metallic ribs joined together at top and bottom and slotted on their inner sides, and a sheathing composed of corrugated metal sheets riveted together and to said ribs, said slots affording access to said rivets.

2. In an airplane fuselage, a plurality of transverse slotted tubular metal ribs, sheets of corrugated sheet metal enclosing said ribs, and a cap strip covering the longitudinal joints of said ribs and sheets, the edges of said sheets being pressed flat where they overlap under said strip, and said sheets being riveted to said ribs opposite the slots in the latter.

3. In an airplane, the combination of tubular metal ribs formed in substantially semicircular halves, and splicing blocks inserted in the abutting ends of said halves and riveted thereto.

In testimony whereof I have hereunto set my hand.

BENJAMIN DOUGLAS THOMAS.